(12) United States Patent
Colle et al.

(10) Patent No.: US 7,585,816 B2
(45) Date of Patent: Sep. 8, 2009

(54) METHOD FOR INHIBITING HYDRATE FORMATION

(75) Inventors: Karla S. Colle, Houston, TX (US); Larry D. Talley, Friendswood, TX (US); John M. Longo, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 575 days.

(21) Appl. No.: 10/555,227

(22) PCT Filed: Jun. 15, 2004

(86) PCT No.: PCT/US2004/018954

§ 371 (c)(1),
(2), (4) Date: Nov. 1, 2005

(87) PCT Pub. No.: WO2005/005567

PCT Pub. Date: Jan. 20, 2005

(65) Prior Publication Data

US 2006/0205603 A1    Sep. 14, 2006

Related U.S. Application Data

(60) Provisional application No. 60/484,588, filed on Jul. 2, 2003.

(51) Int. Cl.
*C09K 8/524* (2006.01)
*C09K 8/588* (2006.01)

(52) U.S. Cl. .................. 507/90; 137/803; 137/807; 210/634; 210/749; 422/4; 422/28; 507/225; 507/239; 507/241

(58) Field of Classification Search ............. 507/90, 507/225, 239, 241; 210/634, 749; 137/803, 137/807; 422/4, 28
See application file for complete search history.

(56) References Cited

U.S. PATENT DOCUMENTS

| | | | |
|---|---|---|---|
| 3,463,730 A * | 8/1969 | Booth et al. ............... 210/701 |
| 4,072,607 A * | 2/1978 | Schiller et al. ............. 210/701 |
| 4,915,176 A | 4/1990 | Sugier et al. |
| 4,973,775 A | 11/1990 | Sugier et al. |
| 5,244,878 A | 9/1993 | Sugier et al. |
| 5,248,665 A | 9/1993 | Hale et al. ................ 507/136 |
| 5,426,258 A | 6/1995 | Thomas et al. |
| 5,434,323 A | 7/1995 | Durand et al. |
| 5,491,269 A | 2/1996 | Colle et al. |
| 5,536,893 A | 7/1996 | Gudmundsson |
| 5,600,044 A | 2/1997 | Colle et al. |
| 5,741,758 A | 4/1998 | Pakulski ................... 507/90 |
| 5,744,665 A | 4/1998 | Costello et al. |
| 5,816,280 A | 10/1998 | Rojey et al. |
| 5,817,898 A | 10/1998 | Delion et al. |
| 5,841,010 A | 11/1998 | Rabeony et al. |
| 5,848,644 A | 12/1998 | Velly et al. ............... 166/267 |
| 5,877,361 A | 3/1999 | Rojey et al. |
| 5,879,561 A | 3/1999 | Klomp et al. |
| 5,900,516 A | 5/1999 | Talley et al. |
| 5,936,040 A | 8/1999 | Costello et al. |
| 5,941,096 A | 8/1999 | Gudmundsson |
| 5,958,844 A | 9/1999 | Sinquin et al. |
| 6,015,929 A | 1/2000 | Rabeony et al. |
| 6,028,233 A * | 2/2000 | Colle et al. ................. 585/15 |
| 6,102,986 A | 8/2000 | Klug |
| 6,107,531 A | 8/2000 | Colle et al. |
| 6,117,929 A | 9/2000 | Bakeev et al. ............. 524/376 |
| 6,177,497 B1 | 1/2001 | Klug et al. |
| 6,180,699 B1 | 1/2001 | Bakeev et al. ............. 524/104 |
| 6,194,622 B1 | 2/2001 | Peiffer et al. |
| 6,222,083 B1 | 4/2001 | Colle ........................ 585/15 |
| 6,307,191 B1 | 10/2001 | Waycuilis |
| 6,319,971 B1 | 11/2001 | Kelland et al. ............. 524/379 |
| 6,350,928 B1 | 2/2002 | Waycuilis et al. |
| 6,444,852 B1 | 9/2002 | Milburn et al. |
| 6,566,309 B1 | 5/2003 | Klug et al. ................ 507/90 |
| 6,656,366 B1 | 12/2003 | Fung et al. |
| 6,703,534 B2 | 3/2004 | Waycuilis et al. |
| 6,867,262 B1 | 3/2005 | Angel et al. |
| 7,008,466 B2 | 3/2006 | Collins |
| 2004/0129609 A1 | 7/2004 | Argo et al. |
| 2004/0159041 A1 | 8/2004 | Dahlmann et al. |
| 2004/0176650 A1 | 9/2004 | Lund et al. |
| 2005/0081714 A1 | 4/2005 | Panchalingam et al. |
| 2005/0137432 A1 | 6/2005 | Matthews et al. |

FOREIGN PATENT DOCUMENTS

CA    2036084    8/1991

(Continued)

OTHER PUBLICATIONS

European Search Report No. 110233, dated Jan. 19, 2004, for 2003UR028, 3 pages.

(Continued)

*Primary Examiner*—Timothy J Kugel

(57) ABSTRACT

A method for inhibiting the formation of gas hydrates in a petroleum fluid having hydrate-forming constituents is claimed. More specifically, the method can be used to treat a petroleum fluid, such as natural gas conveyed in a pipe, to inhibit the formation of a hydrate flow restriction in the pipe. The preferred hydrate inhibitors used for practicing the method comprise substantially water soluble homopolymers and copolymers of isopropylmethacrylamide derivatives which have a bimodal molecular weight distribution.

35 Claims, 1 Drawing Sheet

FOREIGN PATENT DOCUMENTS

| | | | |
|---|---|---|---|
| EP | 0 526 929 | B1 | 1/1996 |
| GB | 2 349 889 | A | 11/2000 |
| GB | 2 363 148 | A | 12/2001 |
| WO | WO 93/25798 | A1 | 12/1993 |
| WO | WO 95/17579 | A1 | 6/1995 |
| WO | WO 96/34177 | A1 | 10/1996 |
| WO | WO 99/13197 | A1 | 3/1999 |
| WO | WO 2005026291 | A2 * | 3/2005 |
| WO | WO 2005/058450 | A2 | 6/2005 |
| WO | WO 2006/027609 | A1 | 3/2006 |
| WO | WO 2006/048666 | A2 | 5/2006 |
| WO | WO 2006/052455 | A2 | 5/2006 |
| WO | WO 2006/068929 | A1 | 6/2006 |

OTHER PUBLICATIONS

International Search Report and Written Opinion of the International Searching Authority for PCT/US04/18954 mailed Nov. 16, 2004, 7 pages.

International Preliminary Report on Patentability for PCT/US04/18954 mailed Jul. 19, 2005, 5 pages.

Erik M. Freer et al., "Methane hydrate film growth kinetics", Fluid Phase Equilibria, 2001, pp. 65-75, vol. 185, Elsevier Science B.V.

T. Johnson et al., "Looking for Hydrates in Places Other Than Flowlines and Pipelines", OTC17345, 2005 Offshore Technology Conference, May 2-5, 2005, 4 pages, Houston, TX.

Ju Dong Lee et al., "Methane-ethane and methane-propane hydrate formation and decomposition on water droplets", Chemical Engineering Science, 2005, pp. 4203-4212, vol. 60, Elsevier Science B.V.

M. Mork et al., "Rate of Hydrate Formation In Subsea Pipelines, Correlation Based On Reactor Experiments", $12^{th}$ International Oil Field Chemistry Symposium, Apr. 1-4, 2001, 11 pages, Geilo Norway.

Larry Talley et al., "Comparison of Laboratory Results on Hydrate Induction Rates in a THF Rig, High-Pressure Rocking Cell, Miniloop, and Large Flowloop", *Gas Hydrates, Challenges for the Future: Annals of the New York Academy of Sciences*, Oct. 2001, pp. 314-321, vol. 912, New York, NY.

Yingming Xie et al., "Gas hydrate fast nucleation from melting ice and quiescent growth along vertical heat transfer tube", Science in China, Series B, 2005, pp. 75-82, vol. 48/1.

Matthews, Patrick N., "Quantification of Significant Variables in Kinetic Hydrate Inhibition", Colorado School of Mines, M.S. thesis T-4987, Apr. 4, 1997, 120 pages, Golden, CO.

* cited by examiner

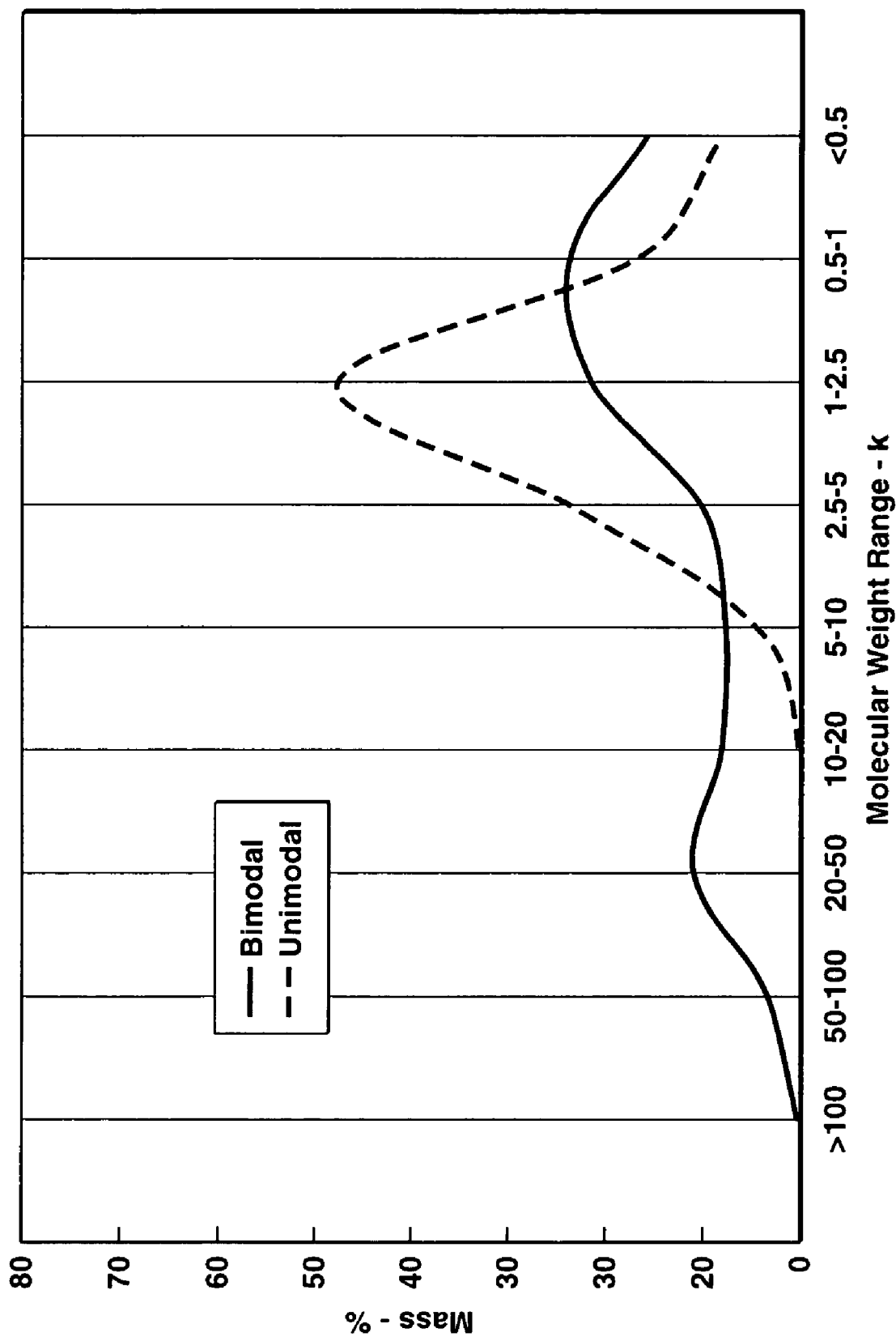

METHOD FOR INHIBITING HYDRATE FORMATION

CROSS REFERENCE TO RELATED APPLICATIONS

This application is the National Stage of International Application No. PCT/US04/18954, filed 15 Jun., 2004, which claims the benefit of U.S. Provisional Patent Application No. 60/484,588, filed 2 Jul., 2003.

FIELD OF THE INVENTION

The present invention relates to a method for inhibiting the formation of clathrate hydrates in a fluid. More specifically, the invention relates to a method for inhibiting the formation of gas hydrates in petroleum fluids.

BACKGROUND OF THE INVENTION

Petroleum fluids typically contain carbon dioxide and hydrogen sulfide, as well as various hydrocarbons, such as methane, ethane, propane, normal butane and isobutane. Water, present as a vapor and/or as a liquid phase, is also typically found mixed in varying amounts with such hydrocarbons. Under conditions of elevated pressure and reduced temperature, clathrate hydrates can form when such petroleum fluids contain water. Clathrate hydrates are water crystals which form a cage-like structure around "guest" molecules such as hydrate-forming hydrocarbons or other gases. Some hydrate-forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Other gases which may form hydrates include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of natural gas and other petroleum fluids. For example, at a pressure of about 1,000 kPa (145 psi), ethane can form gas hydrates at temperatures below 4° C. (39° F.), and at a pressure of 3,000 kPa (435 psia), ethane can form gas hydrates at temperatures below 14° C. (57° F.). Such temperatures and pressures are not uncommon for many operating environments where natural gas and other petroleum fluids are produced and transported.

As gas hydrates agglomerate, they can produce hydrate blockages in the pipe or conduit used to produce and/or transport natural gas or other petroleum fluids. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions often requires design and equipment modifications, such as insulated or jacketed piping. Such modifications are costly to implement and maintain. The amount of antifreeze required to prevent hydrate blockages is typically between 10% to 30% by weight of the water present in the oil or gas stream. Consequently, several thousand gallons per day of such antifreeze can be required. Such quantities present handling, storage, recovery, and potential toxicity issues. Moreover, these solvents are difficult to completely recover from the production or transportation stream. Additional background can be found in U.S. Pat. No. 5,248,665 to Hale et al., U.S. Pat. No. 6,566,309 to Feustel et al., U.S. Pat. No. 6,319,971 to Rodger et al., U.S. Pat. No. 5,848,644 to Velly et al., G.B. 2,363,148 to Baker Huges Inc., U.S. Pat. No. 6,180,699 to Bakeev et al., and G.B. 2,349,889 to Nippon Catalytic Chem. Ind.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream. As discussed more fully below, the inhibitors of this invention can effectively treat a petroleum fluid having a water phase, or a petroleum fluid containing water vapor that may condense to form a water phase, depending upon the operating environment.

SUMMARY OF THE INVENTION

According to the invention, there is provided a method for inhibiting the formation of clathrate hydrates in a fluid having hydrate-forming constituents using a polymer with a bimodal molecular weight distribution. The method comprises contacting the fluid with an inhibitor of the invention comprising a substantially water-soluble polymer made with a bimodal molecular weight distribution. Alternatively, the inhibitor may comprise a blend of a high molecular weight (HMW) polymer and a low molecular weight (LMW) polymer. Another embodiment of the invention comprises contacting a fluid with an inhibitor comprising a broad (bimodal) molecular weight distribution including HMW and LMW components of the same polymer. Still another embodiment of the invention is a method of making a hydrate inhibitor by combining HMW and LMW polymer components to form a hydrate inhibitor with a bimodal molecular weight distribution.

Whether the inhibitor polymer is manufactured as a polymer having a bimodal molecular weight distribution, or is prepared by blending two or more polymers with different molecular weights, it is preferable for the inhibitor polymer to contain predominantly two fractions. Where the polymer is manufactured as a bimodal polymer, it contains two fractions, one LMW and one HMW. The LMW fraction preferably has an average number of mer units sufficient to produce a weight average molecular weight of less than 10,000, and preferably between 500 and 10,000. The HMW fraction preferably has an average number of mer units sufficient to produce a weight average molecular weight between 10,000 and 6,000,000, and preferably between 10,000 and 1,000,000. Alternatively, the polymers of the invention may have a LMW component containing polymer chains of 5 up to 100 mer units, and a HMW component containing polymer chains of from 100 to 6,000 mer units.

The values of fractions of LMW and HMW polymers can vary. The weight ratio may vary from 20:1 LMW:HMW to 1:1 LMW:HMW, preferably from 15:1 LMW:HMW to about 1:1 LMW:HMW, and most preferably from 12:1 LMW:

HMW to about 6:1 LMW:HMW. Ratios which provide the most effective inhibitors for a given system are preferred.

The proportions of LMW and HMW polymer components may vary. The bimodal polymers of the invention may contain from 60 mass percent (mass %) to 95 mass % polymer with a weight average molecular weight from 500 to 10,000, preferably 75 mass % to 95 mass % polymer with a weight average molecular weight from 500 to 10,000, and alternatively 80 mass % to 95 mass % polymer with a weight average molecular weight from 500 to 10,000. The bimodal polymers of the invention may contain from 5 mass % to 40 mass % polymer with a weight average molecular weight from 10,000 to 6,000,000, preferably 5 mass % to 25 mass % polymer with a weight average molecular weight from 10,000 to 6,000,000, and alternatively 5 mass % to 20 mass % polymer with a weight average molecular weight from 10,000 to 6,000,000.

The bimodal polymers of the invention will also exhibit a minimum point between two peaks on the molecular weight mass distribution curve, with the minimum typically occurring between 5,000 and 100,000 weight average molecular weight. Additionally, bimodal polymers also include polymers that have two or more minimum points between three or more peaks on the molecular weight mass distribution curve.

A number of polymeric hydrate inhibitors may be suitable for the invention, including N-vinyl amides, N-allyl amides, acrylamides, methacrylamides, N-vinyl lactams, maleimides, vinyl oxazolines, and esters or amides of N-acyldehydroalanine. These polymeric hydrate inhibitors may be homopolymers, or alternatively, polymerized with each other to form suitable hydrate inhibitor copolymers. Such polymers of the invention should exhibit the desired bimodal molecular weight distribution. A blend of one polymer with a different polymer also may be suitable to provide the desired bimodal molecular weight distribution.

One preferred embodiment of the invention comprises contacting the fluid with an inhibitor comprising an isopropylmethacrylamide (IPMA) polymer made with a bimodal molecular weight distribution. Alternatively, the inhibitor may comprise a blend of both HMW and LMW polymer components made from isopropylmeth-acrylamide. Another embodiment of the invention comprises contacting a fluid with an inhibitor comprising a polymer made from isopropylmethacrylamide having a bimodal molecular weight distribution.

Another preferred embodiment of the invention comprises contacting the fluid with an inhibitor comprising an N-vinyl caprolactam polymer made with a bimodal molecular weight distribution. Alternatively, the inhibitor may comprise a blend of both HMW and LMW polymer components made from N-vinyl caprolactam. Another embodiment of the invention comprises contacting a fluid with an inhibitor comprising a polymer made from N-vinyl caprolactam having a bimodal molecular weight distribution.

BRIEF DESCRIPTION OF THE DRAWINGS

FIG. 1 illustrates the mass distribution versus molecular weight curve for a LMW unimodal polymer and a bimodal polymer, as determined by GPC analysis.

DETAILED DESCRIPTION OF THE INVENTION

Inventive Method

The inventive method of the invention inhibits the formation of clathrate hydrates in a fluid having hydrate-forming constituents. Formation of clathrate hydrates means the nucleation, growth, and/or agglomeration of clathrate hydrates. Such clathrate hydrates may be formed in a fluid whether it is flowing or substantially stationary, but are most problematic in flowing fluids conveyed in a pipe. For example, flow restrictions arising from partial or complete blockages in a fluid can arise as clathrate hydrates adhere to and accumulate along the inside wall of the pipe used to convey the fluid. In addition, the invention can be used for inhibiting formation of clathrate hydrates in substantially stationary fluids.

In one embodiment of the invention, a concentrated solution or mixture of one or more of the inhibitors of the invention is introduced into a petroleum fluid. The term petroleum fluid includes fluids that are gases and/or liquids when under standard conditions, such as natural gas, crude oil, and various petroleum product streams. As the inhibitor solution of the invention is substantially dispersed in the fluid, it reduces the rate that clathrate hydrates are formed, and thereby reduces the tendency for a flow restriction to occur.

In a preferred embodiment, a solid inhibitor is first dissolved into an appropriate carrier solvent or liquid to make a concentrated solution or mixture. Alternatively, the inhibitor may be provided in a solution where it is left as dissolved in its polymerization reaction solvent. The solvent will preferably dissolve the inhibitor and, for convenience, such liquids are referred to hereafter as solvents, whether they produce an inhibitor solution, emulsion, or other type of mixture. The carrier solvent's principal purpose is to act as a carrier for the inhibitor and to facilitate the inhibitor's dispersion into the petroleum fluid. Any solvent suitable for delivering the inhibitor to the petroleum fluid may be used. Such carrier solvents include, but are not limited to, water, brine, sea water, produced water, methanol, ethanol, propanol, isopropanol, ethylene glycol, propylene glycol, derivatives of alcohols and glycols or mixtures of such solvents. Other solvents familiar to those skilled in the art may also be used. Aqueous solvents (water, brine, sea water, produced water) are preferred.

It should be understood that the use of a carrier solvent is not required to practice the invention, but it is a convenient method of introducing and dispersing the inhibitor into the fluid. In many applications, the use of a carrier solvent will facilitate treatment of the fluid stream. As noted above, water is frequently present along with hydrocarbons and other gases present in petroleum fluids. The presence of an aqueous phase in a petroleum fluid is not essential, but if present, will facilitate the dispersion of the inhibitor within the petroleum fluid. The presence of a significant aqueous phase in the petroleum fluid may reduce or eliminate the amount of carrier solvent required for dispersion of the inhibitor.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition and molecular weight of the inhibitor, the system temperature, the inhibitor's solubility in the carrier solvent at application conditions, and the presence of an aqueous phase in the petroleum fluid. If there is no aqueous phase present in the petroleum fluid, a dilute solution may be preferred.

The inhibitor mixture is introduced into the petroleum fluid using mechanical equipment, such as a chemical injection pump or other device which will be apparent to those skilled in the art. However, such equipment is not essential to practicing the invention. To ensure an efficient and effective treatment of the petroleum fluid with the inhibitor mixture, several factors should be considered.

First, an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion throughout the petroleum fluid.

The inhibitor's solubility over a wide range of temperatures is important for ensuring that the polymer can be effectively injected under typical field conditions. Many polymeric inhibitors exhibit lower critical solution temperature, or LCST behavior when dissolved in water or brine. As the temperature of such solutions is increased, the polymer reaches a temperature where it will precipitate out of solution. The temperature above which the polymer will precipitate out of its solution is known as the polymer's cloud point, or $T_{cp}$. Various methods for determining a polymer's $T_{cp}$ at various compositions and pressures are well known to those skilled in the art. When the inhibitor solution temperature exceeds the cloud point for a particular polymer, the polymer will precipitate out of solution.

It is important to convey the inhibitor solution to the petroleum fluid at a temperature lower than its cloud point. The cloud point for a given polymer solution is dependent upon several factors, including the polymer concentration, other components present in the solution (such as dissolved salts), and the ambient temperature and pressure of the solution. In many oil and gas production situations, the inhibitor is injected under conditions where the temperature of the petroleum fluid to which the inhibitor is added can range as high as 100° C.-150° C. (212° F.-302° F.) or more. Consequently, it is desirable to select a polymer that exhibits a cloud point greater than the anticipated temperature of the petroleum fluid. Alternatively, the inhibitor could be injected at some point in the production system where the temperature of the petroleum fluid is below the polymer solution's cloud point.

Because the inhibitor primarily serves to inhibit the formation of clathrate hydrates, rather than to reverse such formation, it is important to treat the fluid prior to substantial formation of clathrate hydrates. As a wet petroleum fluid cools, it will eventually reach a temperature, known as the hydrate equilibrium dissociation temperature, or $T_{eq}$, below which hydrate formation is thermodynamically favored. A petroleum fluid's $T_{eq}$ will shift as the pressure applied to the fluid, and its composition, change. Various methods for determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

Sub-cooling is a measure of the effectiveness of a hydrate inhibitor. When a petroleum fluid contains hydrate-forming constituents, clathrate hydrates will begin to form rapidly at a given temperature. As the hydrate-forming constituents (typically gases) are consumed in forming clathrate hydrates, there is an abrupt and corresponding decrease in the volume of gas in the petroleum fluid as hydrates are formed. The temperature at which this abrupt decrease in the volume of gas is observed is known as the temperature of onset for hydrate formation, or $T_{os}$. Various methods known to those skilled in the art, such as the mini-loop procedure described below, may be used to determine a fluid's $T_{os}$. As noted above, the hydrate equilibrium dissociation temperature, or $T_{eq}$, is the temperature below which hydrate formation is thermodynamically favored in an aqueous/gas solution without an inhibitor present. A hydrate inhibitor's sub-cooling, or $T_{sub}$, is the difference between the $T_{eq}$ and the $T_{os}$. Note that the sub-cooling is not actually a temperature, but a difference, measured in degrees, between two temperatures. Therefore, for a given pressure, the greater the sub-cooling temperature, the more effective the inhibitor. Typically, an aqueous sea salt/gas solution with no inhibitor present produces a $T_{sub}$ of about 3 to 4° C. (5 to 7° F.) in laboratory testing.

The polymers of the invention offer the unique advantage of effective hydrate inhibition as measured by subcooling, thereby preventing nucleation of hydrates. The concentration of inhibitor polymer present in the aqueous phase of a petroleum fluid will typically vary from about 0.01 percent by weight (wt %) to about 5 wt %, based upon the aqueous phase present in the fluid. Preferably, the inhibitor polymer will be present at a concentration of from about 0.01 wt % to about 0.5 wt %. Most preferably, the inhibitor polymer will be present in an aqueous phase at a concentration of from about 0.1 wt % to about 0.5 wt %. The effective amount of an inhibitor polymer for a particular application can be determined by those skilled in the art, by considering the inhibitor polymer's performance factors, the degree of inhibition required for the petroleum fluid, and the inhibitor polymer's cost. A higher inhibitor polymer concentration can be used to lower the temperature at which a hydrate blockage would occur.

Novel Inhibitors

A number of polymeric hydrate inhibitors may be suitable for the invention, including N-vinyl amides, N-allyl amides, acrylamides, methacrylamides, N-vinyl lactams, maleimides, vinyl oxazolines, and esters or amides of N-acyldehydroalanine. These polymeric hydrate inhibitors may be homopolymers, or alternatively, polymerized with each other to form suitable hydrate inhibitor copolymers. Such polymers of the invention should exhibit the desired bimodal molecular weight distribution. A blend of one polymer with a different polymer also may be suitable to provide the desired bimodal molecular weight distribution.

The term "homopolymer" as used herein includes a polymer having the same monomeric repeating unit, while the term "copolymer" as used herein includes polymers having two or more different monomeric repeating units. The term "polymer" is used for all types of polymers, including both homopolymers and copolymers. The term "mer-unit" is used to describe both the polymer units formed when monomers are linked into a polymer chain, and also the polymer units of a polymer chain that result from the conversion of one type of polymer into another type of polymer, by some reaction or conversion that occurs subsequent to the polymerization reaction.

Whether the inhibitor polymer is manufactured as a polymer having a bimodal molecular weight distribution, or is prepared by blending two or more polymers with different molecular weights, it is preferable for the inhibitor polymer to contain predominantly two fractions. It may be easier to obtain the desired hydrate inhibitor characteristics through blending two polymer components. Whether the polymer is manufactured as a bimodal polymer or prepared by blending, it contains two fractions, one LMW and one HMW. The LMW fraction preferably has an average number of mer units sufficient to produce a weight average molecular weight of less than 10,000, and preferably between about 500 and about 10,000. The HMW fraction preferably has an average number of mer units sufficient to produce a weight average molecular weight between about 10,000 and about 6,000,000, and preferably between about 10,000 and about 1,000,000. Alternatively, the polymers of the invention may have a LMW component containing polymer chains of about 5 up to 100 mer units, and a HMW component containing polymer chains of from 100 to about 6000 mer units. The values of fractions LMW and HMW polymers can vary. The weight ratio may vary from about 20:1 LMW:HMW to about 1:1 LMW:HMW, preferably from about 15:1 LMW:HMW to about 1:1 LMW:HMW, more preferably from about 12:1 LMW:HMW to about 6:1 LMW:HMW. Ratios which provide the most effective inhibitors for a given system are preferred.

The proportions of LMW and HMW polymer components may vary. The bimodal polymers of the invention may contain from 60 mass percent (mass %) to 95 mass % polymer with a weight average molecular weight from 500 to 10,000, preferably 75 mass % to 95 mass % polymer with a weight average molecular weight from 500 to 10,000, and alternatively 80 mass % to 95 mass % polymer with a weight average molecular weight from 500 to 10,000. The bimodal polymers of the invention may contain from 5 mass % to 40 mass % polymer with a weight average molecular weight from 10,000 to 6,000,000, preferably 5 mass % to 25 mass % polymer with a weight average molecular weight from 10,000 to 6,000,000, and alternatively 5 mass % to 20 mass % polymer with a weight average molecular weight from 10,000 to 6,000,000.

The bimodal polymers of the invention will also exhibit a minimum point between two peaks on the molecular weight mass distribution curve, with the minimum typically occurring between 5,000 and 100,000 weight average molecular weight. Additionally, bimodal polymers also include polymers that have two or more minimum points between three or more peaks on the molecular weight mass distribution curve.

A polymer is sometimes characterized as a bowl of spaghetti. Sometimes the individual strands of spaghetti are all approximately the same length, while at other times, the individual strands of spaghetti may have a wide variety of different lengths. This is one analogy used to describe molecular weight variations among polymers. The polymers of the invention would be characterized as bowls of spaghetti wherein the individual strands of spaghetti have primarily two lengths, with a significant difference between the two lengths.

The LMW and HMW components are each comprised of a distribution of polymer lengths and therefore of polymer masses and weights. The mass distribution is determined generally by the method of gel permeation chromatography (GPC). GPC data appear as smooth curves of relative mass of polymer versus retention time. The molecular weight of the various lengths of polymer detected must be deduced by the retention time of a mass of similar polymer of known single molecular weight or known multiple molecular weights. The curve can then be plotted with the x-axis labeled by molecular weight rather than retention time.

FIG. 1 shows the mass distribution versus molecular weight of a LMW unimodal IPMA polymer and a bimodal IPMA polymer, as determined by GPC analysis.

In comparison to a bimodal polymer, the curve for the unimodal molecular weight polymer has one main large peak. A unimodal distribution does not have a minimum in the distribution curve except at the two endpoints of the curve.

The curve for the bimodal molecular weight distribution is defined by a mass distribution curve with a slope of zero at two or more molecular weights (or retention times) where the mass fractions are greater than zero. These curves are said to have peaks at two or more molecular weights (or retention times). All bimodal distributions also have one or more low point(s) on the curve located between the two or more peaks of the mass distribution at which the slope of the mass distribution curve is zero. This point in the curve may have a mass fraction greater than or equal to zero. For bimodal polymers that are prepared by blending two polymers of different molecular weights, the minimum would typically occur at zero mass fraction. For bimodal polymers that are manufactured as a polymer having a bimodal molecular weight distribution, the minimum would typically occur at a mass fraction greater than zero. In FIG. 1, the minimum in the bimodal mass distribution for the bimodal IPMA polymer occurs at about 5-10 k molecular weight, and it is greater than zero.

In one alternative, the inhibitor of the invention is a bimodal N-vinyl lactam of the formula:

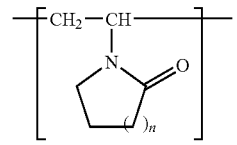

where n ranges from one to three, such as N-vinyl caprolactam, and N-vinyl pyrrolidone, and N-vinyl piperidone. Preferred N-vinyl lactams include N-vinyl caprolactam, and N-vinyl pyrrolidone, and N-vinyl caprolactam is particularly preferred.

Alternatively, the inhibitor of the invention is a bimodal acrylamide or methacrylamide of the formula:

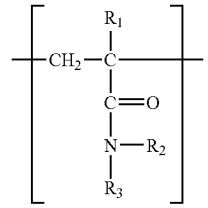

where $R_1$ is hydrogen or a methyl group; $R_2$ is a hydrocarbon group having one to ten carbon atoms, and zero to four heteroatoms selected from the group consisting of nitrogen, oxygen, sulfur, and combinations thereof; and $R_3$ is a hydrogen atom or a hydrocarbon group having one to ten carbon atoms, and zero to four heteroatoms selected from the group consisting of nitrogen, oxygen, sulfur, and combinations thereof; $R_2$ and $R_3$ have a sum total of carbon atoms greater than or equal to one, but less than eight. The $R_2$ and $R_3$ carbon atoms may be branched, normal, or cyclic; $R_2$ is an alkyl, cycloalkyl, or an aryl group; and $R_3$ is either hydrogen or an alkyl, cycloalkyl, or an aryl group.

Preferred acrylamides and methacrylamides are N-substituted acrylamides and N-substituted methacrylamides, such as isopropylacrylamide, methacryloylpyrrolidine and N-isopropyl methacrylamide (IPMA). The particularly preferred inhibitors of the invention are bimodal N-isopropyl methacrylamides represented by the following general formula:

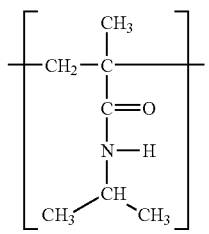

The preferred inhibitor includes two IPMA components, one a weight average molecular weight between about 500 and 10,000 and the other a weight average molecular weight of between about 10,000 and 6,000,000. The polymer with the lower molecular weight is referred to as LMW IPMA, and the polymer with the higher molecular weight is referred to as HMW IPMA. The ratio of low to high molecular weight IPMA can vary. The weight ratio may vary from about 15:1 LMW:HMW to about 1:1 LMW:HMW, preferably from about 12:1 LMW:HMW to about 6:1 LMW:HMW. Ratios which provide the most effective inhibitors for a given system are preferred.

While certain polymeric materials have previously been shown to be effective inhibitors for gas hydrate formation, there is no suggestion that polymers with bimodal molecular weight distributions would prove to be advantageous. It is a surprising result of this work that inhibitor polymers with bimodal molecular weight distributions have substantially improved performance as kinetic hydrate inhibitors relative to the same polymers with a narrow molecular weight range.

A polymeric material with a bimodal molecular weight distribution can be produced either during the polymerization process itself or post polymerization. Methods are known in the literature for producing bimodal molecular weight distributions during the polymerization reaction and can vary depending on the nature of the monomer and reaction conditions. Some of the ways that a bimodal distribution can be obtained during the polymerization process include, but are not limited to, choice of polymerization catalyst, staged initiator addition, use of emulsifiers, control of reaction viscosity, the presence of preformed polymer, and choice of polymerization solvent. Conditions for production of a bimodal distribution should be optimized for a particular polymer and any reaction/system constraints. Bimodal molecular weight distributions can also be obtained post polymerization. One way that a bimodal molecular weight distribution can be obtained post polymerization includes, but is not limited to, mixing of a high molecular weight polymer sample with a low molecular weight polymer sample in the appropriate ratio to give the desired bimodal molecular weight distribution.

The generic structures above as well as the examples given are intended to cover any substantially water soluble polymers including, but not limited to, copolymers, terpolymers, other complex polymers, and blends and mixtures thereof, having the structural units described, whether such structural units or their related monomers were used to synthesize the polymer or not. The monomers disclosed below for synthesizing the polymers containing the preferred mer-units are not intended to limit the scope of the claims. Other starting materials and synthesis techniques, which are currently known or may become known, will be apparent to those skilled in the art as alternatives to synthesizing the polymers of the claimed invention. Accordingly, all polymers having at least the structural unit identified in the claims below, even though such polymers may be produced from starting materials and/or by means not explicitly referenced herein, are intended to fall within the scope of the claimed invention. Other polymers not specifically identified in the examples below will become apparent to those skilled in the art in light of the detailed discussion below. Such polymers are intended to fall within the scope of the claimed invention.

The above-described polymers and copolymers can be used in a mixture with other polymers or additives useful for enhancing inhibitor performance, or other operating parameters other than those specified here. The above-described isopropylmethacrylamide homopolymers and copolymers could be used in a mixture with other polymers or additives useful for enhancing inhibitor performance, including but not limited to, various polymers, such as poly(N-vinylpyrrolidone) (PVP), poly(N-vinylcaprolactam) (PVCap), copolymers of PVP and PVCap, other homopolymers and copolymers of N-vinylamides, various alcohols, such as methanol, ethanol, propanols, or ethylene glycols.

EXPERIMENTAL RESULTS

Inhibitor Synthesis

Standard laboratory procedures familiar to those skilled in the art were used to synthesize the polymers and copolymers identified below. The polymers were isolated and characterized using techniques well-known to those skilled in the art, such as carbon-13 ($^{13}C$) nuclear magnetic resonance spectroscopy (NMR). Direct measurement of the molecular weight of the polymers of the invention was made using Gel Permeation Chromatography (GPC).

Polymers are characterized by their average molecular weights and their molecular weight distributions. The two most important molecular weight averages are the number average molecular weight, $M_n$, and the weight average molecular weight, $M_w$. The polydispersity index, $M_w/M_n$, is a measure of the uniformity of the molecular weight distribution. A polymer with a bimodal molecular weight distribution will by definition have a high polydispersity index.

GPC analyses were conducted using dimethyl formamide (DMF) with 0.1 M LiBr as the solvent phase. Dual columns in series were used to ensure good separation and analyses over the entire molecular weight range of the samples (PLGEL 5 micron Mixed-D, 7.5×300 mm (Polymer Labs) and Styragel HR1, 7.8×300 mm (Waters)). Refractive index was used as the method of detection. The columns were calibrated with known narrow molecular weight standards of poly(vinylpyridine) and toluene was added as an internal standard.

Example 1

Illustrative

An iso-propylmethacrylamide (IPMA) homopolymer with a bimodal molecular weight distribution was prepared in a polymerization process by loading a solution of 46.5 g isopropyl alcohol and 2.6 g di-t-butylperoxide into a Par bomb and degassing with nitrogen three times. A degassed solution of 51.6 g IPMA in 158 g isopropyl alcohol and 3.9 g di-t-butyl peroxide was pumped into the Parr bomb at 130° C. over four hours. The reaction mixture was heated overnight at 130° C. After cooling, the solvent was removed by rotary evaporation. The polymer was analyzed by $^{13}C$ NMR and GPC. GPC analysis was performed at the conditions described above to determine the molecular weight distribution, and the results are summarized in Table 1 as Example 1A. As can be seen from Table 1, Example 1A actually contains three peaks with a first peak value of 49.2 mass percent at 1-2.5K grams/mole, a second peak value of 1.8 mass percent at 20-50K grams/mole and a third peak value of 0.7 mass percent at 500-1,000K grams/mole. As used herein the term bimodal shall include polymers with two or more peaks, including, for example, polymers with only two peaks and polymers with only three peaks.

The IPMA homopolymer can be isolated from the reaction mixture for use as a kinetic hydrate inhibitor or can be further processed. In some cases, it may be desirable to have the IPMA homopolymer as a solution in ethylene glycol. For those applications, ethylene glycol was added, and the IPA was removed by rotary evaporation. The final product was a gold viscous solution consisting of about 30 wt % polymer in ethylene glycol.

Two additional samples of IPMA homopolymer with a bimodal molecular weight distribution were made simply by blending samples of low and high molecular weight IPMA homopolymer samples, made as described below. The results for these two bimodal blends are summarized in Table 1 as Examples 1B and 1C. All blend compositions shown were prepared using weight percentages.

Example 2

Comparative

High molecular weight IPMA homopolymer for use in post-polymerization preparation of a bimodal molecular weight distribution polymer blend, was prepared as follows.

A round bottomed three-necked flask (1 L) with a condenser, thermometer, overhead stirrer, and $N_2$ sparging tube was set up. 500 mL deionized water was loaded in the flask and sparged with $N_2$ for about 1 hour. 25.4 g (0.2 m) IPMA was added and sparging continued for 30 minutes with stirring. The flask was heated to 60° C. 0.254 g (1 wt % on monomer) ammonium persulfate was dissolved in degassed water and added to the flask. The reaction mixture was heated at 60° C. for 24 hours with stirring. (Note: the polymer that forms will be insoluble at this temperature and will precipitate out). The reaction mixture was cooled and the solution was rotary-evaporated to remove all the water. The solid product was dried in a vacuum oven and analyzed by GPC and $^{13}C$ NMR. The IPMA homopolymer can be used without isolation from the water or can be put into another solvent if so desired for a particular application. The GPC results for this material are summarized in Table 1.

Example 3

Comparative

Low molecular weight IPMA homopolymer, for use in post-polymerization preparation of bimodal molecular weight distribution polymer blend, was prepared by loading 51.6 g (0.41 m) IPMA into a Parr bomb reactor with 150 mL degassed isopropyl alcohol (IPA). The bomb was purged with nitrogen and evacuated three times. The Parr bomb was heated with stirring to 130° C. 9.3 g (18 wt % on monomer) di-t-butyl peroxide was pumped into the Parr bomb over a period of about 1 hour (0.16 g/min) using a high pressure liquid pump. The reaction mixture was heated and stirred overnight. 102.6 g ethylene glycol was added, and the IPA was removed by rotary evaporation. The final product was a gold viscous solution consisting of about 30 wt % polymer in ethylene glycol. $^{13}C$ NMR confirmed the structure and GPC showed $M_w$=2400 with a polydispersity of 2.5. The GPC results are summarized in Table 1. Six different low molecular weight IPMA homopolymers were made using this general procedure (Examples 3A-3F).

Example 4

Illustrative

One sample of a VCap homopolymer with a bimodal molecular weight distribution was made simply by blending samples of low and high molecular weight VCap homopolymer samples. The results for this bimodal blend are summarized in Table 2 as Example 4.

Example 5

Comparative

High molecular weight VCap homopolymer, for use in post-polymerization preparation of a polymer blend having a bimodal molecular weight distribution, was prepared by polymerizing 55.6 g VCap monomer in a solution of 150 mL water and 50 mL isopropyl alcohol using 1.67 g (3.0 wt %) Vazo 67 at 60° C. After five hours, an additional 0.2 g Vazo 67 was added and the reaction was heated for another two hours. The solvent was removed by rotary evaporation, and the resulting polymer was dissolved in ethylene glycol to make a 30 wt % solution. The results for this preparation are shown in Table 2 as Example 5A.

Two low molecular weight Vcap homopolymers (Examples 5B and 5C) were obtained from vendors (BASF and Tros). The GPC results for these samples are summarized in Table 2. In addition, a blend of two homopolymers is also included as Example 5D. All blend compositions shown were prepared using weight percentages.

Mini-Loop Apparatus and Testing Procedure

For the purpose of illustrating the invention, the various polymeric inhibitors described above were evaluated using the mini-loop testing procedure described below. The results of these evaluations are provided in Table 1 for the IPMA polymers and in Table 2 for the VCap polymers.

One method for evaluating an inhibitor's effectiveness uses a high pressure apparatus referred to as a mini-loop. A mini-loop apparatus consists of a loop of stainless steel tubing with about a one-half inch inside diameter and a length of ten to thirty-two feet. The loop may also have a transparent section for observing the fluid flow in the loop and the onset of hydrate formation in the loop. Fluid comprising about 40% by volume (vol %) synthetic sea water solution having about 3.5% total ionized salts, 40 vol % hydrocarbon condensate (i.e., $C_5$+ with trace amounts of butane), and 20 vol % hydrocarbon gas mixture is circulated around the loop at constant pressure. The hydrocarbon gas mixture is comprised of approximately 87 mole % methane, 6 mole % ethane, 4 mole % propane, and 3 mole % of butane. Magnetically-coupled variable speed motors drive high-pressure gear pumps or sliding vane pumps to circulate this mixture through the loop to simulate pipe flow and to keep the system well mixed. The inhibitor is typically injected into the loop as an aqueous solution to produce the desired weight percent (wt %) concentration of inhibitor in the aqueous sea salt/gas solution. Generally, hydrate inhibitors are evaluated at about 0.5 wt % of the aqueous sea salt/gas solution.

The fluid is circulated at a constant velocity of about 0.76 m/second (2.5 feet/second). The loop and its pump are operated in a controlled temperature water bath to control the temperature of the fluid circulating in the loop. The bath water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop, a pressure-compensating device is required. Such a device can be comprised of a gas cell and a hydraulic oil cell separated by a floating piston. As the gas volume in the loop changes, oil may be added or removed from the oil cell to produce a commensurate addition or removal of gas to the loop. Mini-loop tests are typically run at pressures of about 6895 KPa absolute (1,000 pounds per square inch gauge (psig)), 34474 KPa absolute (5,000 psig), or 68,948 KPa absolute (10,000 psig).

To start a new test run, the loop is cleaned with water and condensate washes and blown dry with nitrogen before charging. A vacuum is pulled on the loop and accumulator with the accumulator piston at the top of the accumulator (maximum gas volume). The brine/water is added at room temperature through a ¼-inch valve under suction. Gas condensate is added at room temperature through the same valve. Gas is charged to the loop through the accumulator with the temperatures of the accumulator and loop set at 32-38° C. (90-100° F.). The charge pressure is always lower than the desired experimental loop pressure so that the accumulator piston will always be free-floating below the top endcap of the accumulator while at experimental pressure. The loop pressure is then put under computer control and the loop is ready to begin the experimental sequence.

The temperature of the water bath is reduced at a constant rate, preferably about 6° F. (3.3° C.) per hour, from an initial temperature of about 70° F. (21° C.). At some temperature, clathrate hydrates begin to rapidly form. As gas is consumed in forming clathrate hydrates, there is an abrupt and corresponding decrease in the volume of gas in the fluid as hydrates are formed. The detection of hydrate formation in a mini-loop test apparatus is based upon one or more of the following methods: (1) detection of a decreased gas accumulator volume in excess of vapor-liquid thermal equilibration, (2) detection of a rapid drop in loop pressure in excess of vapor-liquid thermal equilibration, (3) detection of an increase in loop process temperature due to exothermic hydrate heat of formation, (4) detection of an increased differential pressure drop in a flowing system, (5) detection of differential pressure transient oscillations or single spikes across the circulation pump, or (6) visual observation of hydrate solids. The temperature at which one or more of these indicators is first observed is measured as the temperature of onset for hydrate formation, or $T_{os}$, and compared to the hydrate equilibrium dissociation temperature, or $T_{eq}$, to determine the inhibitor's subcooling.

The hydrate disappearance temperature is commonly regarded as the closest observable temperature to the hydrate equilibrium temperature, $T_{eq}$. The following methods are commonly used to determine $T_{eq}$: (1) gas volume changes at constant pressure, (2) gas pressure changes at constant volume, (3) differential pressure drop across an element in the following system, or (4) observation of hydrates. Using a mini-loop test apparatus, the experimental $T_{eq}$ was defined as the temperature at which no hydrate particles were detectable by spikes in the differential pressure across the circulating pump. When measuring $T_{eq}$ caution must be exercised in multi-component experiments that the observed hydrate decomposition occurs at constant water, hydrate and gas phase compositions. If the salinity, gas composition, or hydrate type were to change after the onset of hydrate formation, the measured value of $T_{eq}$ would be shifted relative to the actual value for the initial compositions. Experimentally, if the water and gas fractions in hydrates are small, then the compositions of the bulk gas and water phases will be constant during the measurement of $T_{eq}$. In these experiments, hydrate dissociation was carried out over sufficiently long time that the heating rate no longer affected the measured temperature at which hydrates disappeared. $T_{eq}$ was measured before adding kinetic hydrate inhibitor or other chemicals to a system. The presence of kinetic inhibitor causes the system to equilibrate slowly and makes the measurement of $T_{eq}$ difficult.

A hydrate inhibitor's subcooling, or $T_{sub}$, is the difference between the $T_{eq}$ and the $T_{os}$. Note that the subcooling is not actually a temperature, but a difference, measured in degrees, between two temperatures. For a given pressure, the greater the subcooling, the more effective the inhibitor. Hydrate nucleation starts after the system drops below the hydrate equilibrium temperature and is nearly complete when hydrates are first detected. It is known that hydrate nucleation events actually take place before a system reaches $T_{os}$. The actual time or temperature at which nucleation starts is not determined in these experiments. The hold time is defined as the quantity of time required for nucleation to be detected in a system held at constant temperature. The procedure that is followed for this measurement is to rapidly drop the process temperature from a temperature above $T_{eq}$ to the hold temperature, $T_{hold}$. The hold temperature is greater than $T_{os}$ and less than $T_{eq}$. In practice, the process temperature drops to the hold temperature over a period of hours. Therefore, this experimental procedure cannot accurately measure hold times of the order of the cooldown time.

SUMMARY OF RESULTS

Typically, properties and performance of polymer blends are the average of the two polymers. The isopropylmethacrylamide polymer systems exhibit an unexpected synergy. For example, the subcooling exhibited by Example 1B (43.5° F.) is significantly greater than a weight average prediction based upon its two components (31.5° F.). Also, the subcooling exhibited by Example 1C (28° F.) is significantly greater than a weight average prediction based upon its two components (24.3° F.). Example 1A shows the results obtained with a sample with a bimodal distribution prepared directly in the polymerization process.

Similar results are observed with N-vinylcaprolactam polymers (Table 2). The subcooling exhibited by Example 4 (34° F.) is significantly greater than a weight average prediction based on its two components (28.8° F.).

The means and method for practicing the invention and the best mode contemplated for practicing the invention have been described. It is to be understood that the foregoing is illustrative only and that other means and techniques can be employed without departing from the true scope of the invention as claimed herein.

TABLE 1

Polymer Molecular Weight Distributions and Subcooling Temperatures
Isopropylmethacrylamide (IPMA) Polymers

| Example | Molecular Weight Distribution (Mass %) | | | | | | | | | | | Subcooling @20 Hour Hold Time (° F. and ° C.) | |
|---|---|---|---|---|---|---|---|---|---|---|---|---|---|
| | <0.5K | 0.5-1K | 1-2.5K | 2.5-5K | 5-10K | 10-20K | 20-50K | 50-100K | 100-250K | 250-500K | 500-1,000K | >1,000K | |
| Example 1A GH 193 | 17 | 18 | 49.2 | 8.1 | 1 | 1.4 | 1.8 | 1 | 1 | 0.6 | 0.7 | 0.3 | 37° F. 20.6° C. |
| Example 1B 90% NI-161 + 10% GH-212 | 3.6 | 6.3 | 27.9 | 27.02 | 21.86 | 3.54 | 1.18 | 1.1 | 1.7 | 1.8 | 2 | 2 | 43.5° F. 24.2° C. |
| Example 1C 90% NI-164 + 10% GH-212 | 14.85 | 29.25 | 37.35 | 8.246 | 0.404 | 0.3 | 1 | 1.1 | 1.7 | 1.8 | 2 | 2 | 28° F. 15.6° C. |
| Example 2 GH-212 | 0 | 0 | 0 | 0.2 | 0.8 | 3 | 10 | 11 | 17 | 18 | 20 | 20 | 18° F. 10° C. |
| Example 3A NI-141 | 15.5 | 23.5 | 21 | 10 | 7.5 | 8 | 10.8 | 3.25 | 0.45 | 0 | 0 | 0 | 35° F. 19.4° C. |
| Example 3B NI-137 | 9 | 16 | 26 | 14.6 | 13.9 | 10.5 | 9.2 | 0.79 | 0.01 | 0 | 0 | 0 | 34° F. 18.9° C. |
| Example 3C NI-2003E | 15 | 23 | 33.5 | 12 | 7.5 | 6 | 2.9 | 0.1 | 0 | 0 | 0 | 0 | 33° F. 18.3° C. |
| Example 3D NI-161 | 4 | 7 | 31 | 30 | 24.2 | 3.6 | 0.2 | 0 | 0 | 0 | 0 | 0 | 33° F. 18.3° C. |
| Example 3E NI-167 | 8 | 17 | 47.5 | 23.2 | 4.2 | 0.1 | 0 | 0 | 0 | 0 | 0 | 0 | 29.5° F. 16.4° C. |
| Example 3F NI-164 | 16.5 | 32.5 | 41.5 | 9.14 | 0.36 | 0 | 0 | 0 | 0 | 0 | 0 | 0 | 25° F. 13.9° C. |

TABLE 2

Polymer Molecular Weight Distributions and Subcooling Temperatures
N-Vinylcaprolactam (VCap) Polymers

| Example | Molecular Weight Distribution (Mass %) | | | | | | | | | | | Subcooling @20 Hour Hold Time (° F. and ° C.) | |
|---|---|---|---|---|---|---|---|---|---|---|---|---|---|
| | <0.5K | 0.5-1K | 1-2.5K | 2.5-5K | 5-10K | 10-20K | 20-50K | 50-100K | 100-250K | 250-500K | 500-1,000K | >1,000K | |
| Example 4 90% TR-544 + 10% GH267 | 29.17 | 24.88 | 24.84 | 7.92 | 4.14 | 2.87 | 2.98 | 1.6 | 1.1 | 0.3 | 0.1 | 0 | 34° F. 18.9° C. |
| Example 5B R5-772 | 89.8 | 7.96 | 2.2 | 0.04 | 0 | 0 | 0 | 0 | 0 | 0 | 0 | 0 | 28° F.* 15.6° C. |
| Example 5A GH 267 | 0.1 | 1.3 | 3.6 | 5.4 | 10.8 | 18.8 | 28 | 16 | 11.7 | 3.1 | 1.0 | 0.2 | 18° F. 10° C. |
| Example 5C TR-544 | 32.4 | 27.5 | 27.2 | 8.2 | 3.4 | 1.1 | 0.2 | 0 | 0 | 0 | 0 | 0 | 30° F. 16.7° C. |
| Example 5D 90% R5-722 + 10% GH267 | 80.83 | 7.3 | 2.3 | 0.58 | 1.08 | 1.88 | 2.8 | 1.6 | 1.1 | 0.3 | 0.1 | 0 | 27° F. 15° C. |

*Concentration 0.45 wt % and hold time 18 hours.

We claim:

1. A method for inhibiting the formation of clathrate hydrates in a fluid having hydrate-forming constituents, the method comprising contacting the fluid with an effective amount of a clathrate hydrate inhibitor having a polymer blend of a low molecular weight polymer component and a high molecular weight polymer component, wherein the high-molecular weight component and the low-molecular weight component are of the same polymer, the blend has a bimodal molecular weight distribution, the low molecular weight polymer component contains polymer having a weight average molecular weight of between 500 and 10,000, the high molecular weight polymer component contains polymer having a weight average molecular weight of between 10,000 and 6,000,000, and the ratio of low molecular weight component to high molecular weight component is from 20:1 to 1:1.

2. A method for preparing a hydrate inhibitor by blending a high molecular weight polymer component with a low molecular weight polymer component, wherein the high-molecular weight component and the low-molecular weight component are of the same polymer.

3. The method of claim 2 wherein the low molecular weight polymer component contains polymer having a weight average molecular weight of between 500 and 10,000, the high molecular weight polymer component contains polymer having a weight average molecular weight of between 10,000 and 6,000,000, and the ratio of low molecular weight polymer component to high molecular weight polymer component is from 20:1 to 1:1.

4. A method for inhibiting the formation of clathrate hydrates in a fluid having hydrate-forming constituents, comprising:
contacting the fluid with an effective amount of a hydrate inhibitor comprising a substantially water-soluble polymer having a bimodal molecular weight distribution, wherein the polymer is an N-vinyl lactam having the following general formula:

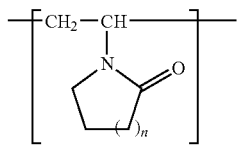

wherein "n" ranges from one to three.

5. The method of claim 4 wherein the polymer is a blend of a high-molecular weight component and a low-molecular weight component of the same polymer.

6. The method of claim 5 wherein the ratio of low molecular weight polymer component to high molecular weight polymer component is from 20:1 to 1:1.

7. The method of claim 6 wherein the ratio of low molecular weight polymer component to high molecular weight polymer component is from about 15:1 to about 1:1.

8. The method of claim 4 wherein the polymer is an N-vinyl caprolactam.

9. The method of claim 8 wherein the N-vinyl caprolactam polymer contains 60 mass % to 95 mass % low molecular weight polymer with a weight average molecular weight of between 500 and 10,000, and 5 mass % to 40 mass % of high molecular weight polymer having a weight average molecular weight of between 10,000 and 6,000,000, and the bimodal polymer exhibits a minimum point on its molecular weight mass distribution curve between 5,000 and 100,000 weight average molecular weight.

10. The method of claim 9, wherein the ratio of low molecular weight polymer component to high molecular weight polymer component is from about 12:1 to about 6:1.

11. The method of claim 4, wherein said polymer exhibits two or more minimum points between three or more peaks on said polymer's molecular weight distribution curve.

12. The method of claim 11 wherein said polymer exhibits only two minimum points between only three peaks on said polymer's molecular weight distribution curve.

13. The method of claim 4 wherein the polymer is polymerized as a bimodal polymer.

14. The method of claim 4 wherein the polymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

15. The method of claim 4 wherein the inhibitor is provided in an aqueous solution, and the fluid is a petroleum fluid.

16. The method of claim 4 wherein the inhibitor is present in the fluid at a concentration of from 0.01 wt % to 0.5 wt % of the water present in the fluid.

17. The method of claim 4, wherein said polymer exhibits only a single minimum point between only two peaks on said polymer's molecular weight distribution curve.

18. A method for inhibiting the formation of clathrate hydrates in a fluid having hydrate-forming constituents, comprising:
contacting the fluid with an effective amount of a hydrate inhibitor comprising a substantially water-soluble polymer having a bimodal molecular weight distribution, wherein the polymer is an acrylamide or methacrylamide of the formula:

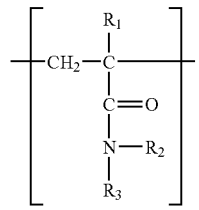

wherein,
$R_1$ is selected from the group consisting of hydrogen and a methyl group;
$R_2$ is a hydrocarbon group having one to ten carbon atoms, and zero to four heteroatoms selected from the group consisting of nitrogen, oxygen, sulfur, and combinations thereof; and
$R_3$ is a hydrogen atom or a hydrocarbon group having one to ten carbon atoms, and zero to four heteroatoms selected from the group consisting of nitrogen, oxygen, sulfur, and combinations thereof.

19. The method of claim 18, wherein $R_2$ and $R_3$ have a sum total of carbon atoms greater than or equal to one, but less than eight.

20. The method of claim 19, wherein $R_2$ and $R_3$ carbon atoms are selected from the group consisting of branched, normal, and cyclic.

21. The method of claim 20, wherein $R_2$ is selected from the group consisting of an alkyl, cycloalkyl, and an aryl group; and
$R_3$ is selected from the group consisting of hydrogen, an alkyl, cycloalkyl, and an aryl group.

22. The method of claim 18, wherein the polymer is an N-isopropyl methacrylamide.

23. The method of claim 22, wherein the N-isopropyl methacrylamide polymer contains 75 mass % to 95 mass % low molecular weight polymer with a weight average molecular weight of between 500 and 10,000, and 5 mass % to 25 mass % of high molecular weight polymer having a weight average molecular weight of between 10,000 and 6,000,000, and the bimodal polymer exhibits a minimum point on its molecular weight mass distribution curve between 5,000 and 100,000 weight average molecular weight.

24. The method of claim 23, wherein the ratio of low molecular weight polymer component to high molecular weight polymer component is from about 12:1 to about 6:1.

25. The method of claim 18, wherein said polymer exhibits two or more minimum points between three or more peaks on said polymer's molecular weight distribution curve.

26. The method of claim 25, wherein said polymer exhibits only two minimum points between only three peaks on said polymer's molecular weight distribution curve.

27. The method of claim 18, wherein the ratio of low molecular weight polymer component to high molecular weight polymer component is from 20:1 to 1:1.

28. The method of claim 27, wherein the ratio of low molecular weight polymer component to high molecular weight polymer component is from about 15:1 to about 1:1.

29. The method of claim 18, wherein the polymer is a blend of a high-molecular weight component and a low-molecular weight component of the same polymer.

30. The method of claim 18, wherein the polymer is polymerized as a bimodal polymer.

31. The method of claim 18, wherein the polymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

32. The method of claim 18, wherein the inhibitor is provided in an aqueous solution, and the fluid is a petroleum fluid.

33. The method of claim 18, wherein the inhibitor is present in the fluid at a concentration of from 0.01 wt % to 0.5 wt % of the water present in the fluid.

34. The method of claim 18, wherein the polymer is selected from the group consisting of isopropylacrylamide, methacryloylpyrrolidine, and N-isopropyl methacrylamide (IPMA).

35. The method of claim 18, wherein said polymer exhibits only a single minimum point between only two peaks on said polymer's molecular weight distribution curve.

* * * * *